United States Patent [19]
Tang et al.

[11] Patent Number: 5,223,838
[45] Date of Patent: Jun. 29, 1993

[54] RADAR CROSS SECTION ENHANCEMENT USING PHASE CONJUGATED IMPULSE SIGNALS

[75] Inventors: Raymond Tang, Fullerton; Kuan M. Lee, Brea; Ruey-shi Chu, Cerritos; Gordon L. Howard, La Habra, all of Calif.

[73] Assignee: Hughes Aircraft Company, Los Angeles, Calif.

[21] Appl. No.: 864,733

[22] Filed: Apr. 7, 1992

[51] Int. Cl.$^5$ .............................................. G01S 7/00
[52] U.S. Cl. ...................................... 342/13; 342/83; 342/201
[58] Field of Search ................ 342/13, 82, 83, 201, 342/202

[56] References Cited
U.S. PATENT DOCUMENTS 4,151,527  4/1979  Masliah et al. ..................... 342/63

Primary Examiner—T. H. Tubbesing
Attorney, Agent, or Firm—Wanda K. Denson-Low

[57] ABSTRACT

An apparatus and a method for enhancing the radar cross section of a target. The present invention is an impulse radar system that implements a method that comprises the following steps. A pilot impulse radar pulse is transmitted at a target. The pilot pulse comprises a plurality of individual pulses having respective distinct frequencies generated by the impulse radar system. A return pulse from the target is received by the impulse radar system and provides information indicative of target scattering centers. The return pulse is used as a calibration signal for generating a phase conjugated pulse. The phase conjugated pulse is then transmitted at the target. Processing a target return signal derived from the transmitted phase conjugated pulse enhances the radar cross section of the target because the waveform of the transmitted phase conjugated pulse is matched to the characteristics of the target. The present invention is adapted to detect low radar cross section targets without encountering the problems and frequency restrictions with conventional radar systems. In a second embodiment of the present invention, when a progressive phase variation is applied to the transmit pulses, the radar cross section contributed by backward travelling wave is made to add in phase in the received direction by processing the received target return pulses while adaptively adjusting the phase sequence of the transmitted pulses. When the appropriate phase sequence is achieved which is such that the transmitted pulses match the scattering centers on the target, then an enhanced return signal is received.

11 Claims, 8 Drawing Sheets

RADAR CROSS SECTION ENHANCEMENT USING PHASE CONJUGATED IMPULSE SIGNALS

BACKGROUND

The present invention relates generally to radar cross section enhancement techniques, and more particularly, to impulse radar system and methods that enhance the radar cross section of targets.

Reduction in radar cross section of a target is conventionally accomplished by shaping the surface of the target and/or by using radar absorptive material. The shaping causes the incident radar signal to reflect specularly away from the source and it is the most effective way of reducing the radar cross section of the target. In fact this shaping approach has made many targets extremely difficult for a radar to detect.

A conventional approach for detecting a low radar cross section target is to increase the radiated power on the target and/or operate the radar sensor at a low frequency where there is a significant increase in the backscattered signal from the target. In either case, this brute-force approach requires an extremely large and high power radar, and consequently, this approach is very expensive.

It is therefore an objective of the present invention to provide a method and apparatus for detecting low radar cross section targets. Another objective of the present invention is to provide a method and apparatus for detecting low radar cross section targets without encountering the above-mentioned problems and frequency restrictions.

SUMMARY OF THE INVENTION

In order to achieve the above objectives, the present invention comprises an apparatus and a method for enhancing the radar cross section of a target. More specifically, the present invention comprises an improved impulse radar system and operating method. The impulse radar system implements the following method which comprises the following steps. A pilot impulse radar pulse is transmitted at a target. The pilot pulse train comprises a plurality of individual pulses having respective distinct frequencies generated by the impulse radar system. A return pulse from the target is then received by the impulse radar system. The return pulse provides information indicative of scattering centers on the target. The return pulse is used as a calibration signal for generating another transmitted pulse. The calibration signal corresponding to the return pulse is used to form a phase conjugate transmit pulse. The phase conjugate transmit pulse corresponding to the return pulse is then transmitted at the target. A target return signal derived from the transmitted phase conjugate pulse enhances the radar cross section of the target. This is achieved since the waveform of the transmitted phase conjugate pulse is matched to the characteristics of the target.

The present invention provides an apparatus and a method for detecting low radar cross section targets without encountering the problems and frequency restrictions enumerated in the Background. As targets such as cruise missiles, and sea skimmer missiles, and the like, become harder to detect, the present invention provides a means and method for detecting these low radar cross section targets.

BRIEF DESCRIPTION OF THE DRAWINGS

The various features and advantages of the present invention may be more readily understood with reference to the following detailed description taken in conjunction with the accompanying drawings, wherein like reference numerals designate like structural elements, and in which:

FIG. 2 shows an impulse radar operating method in accordance with the principles of the present invention;

DETAILED DESCRIPTION

Figure 1:
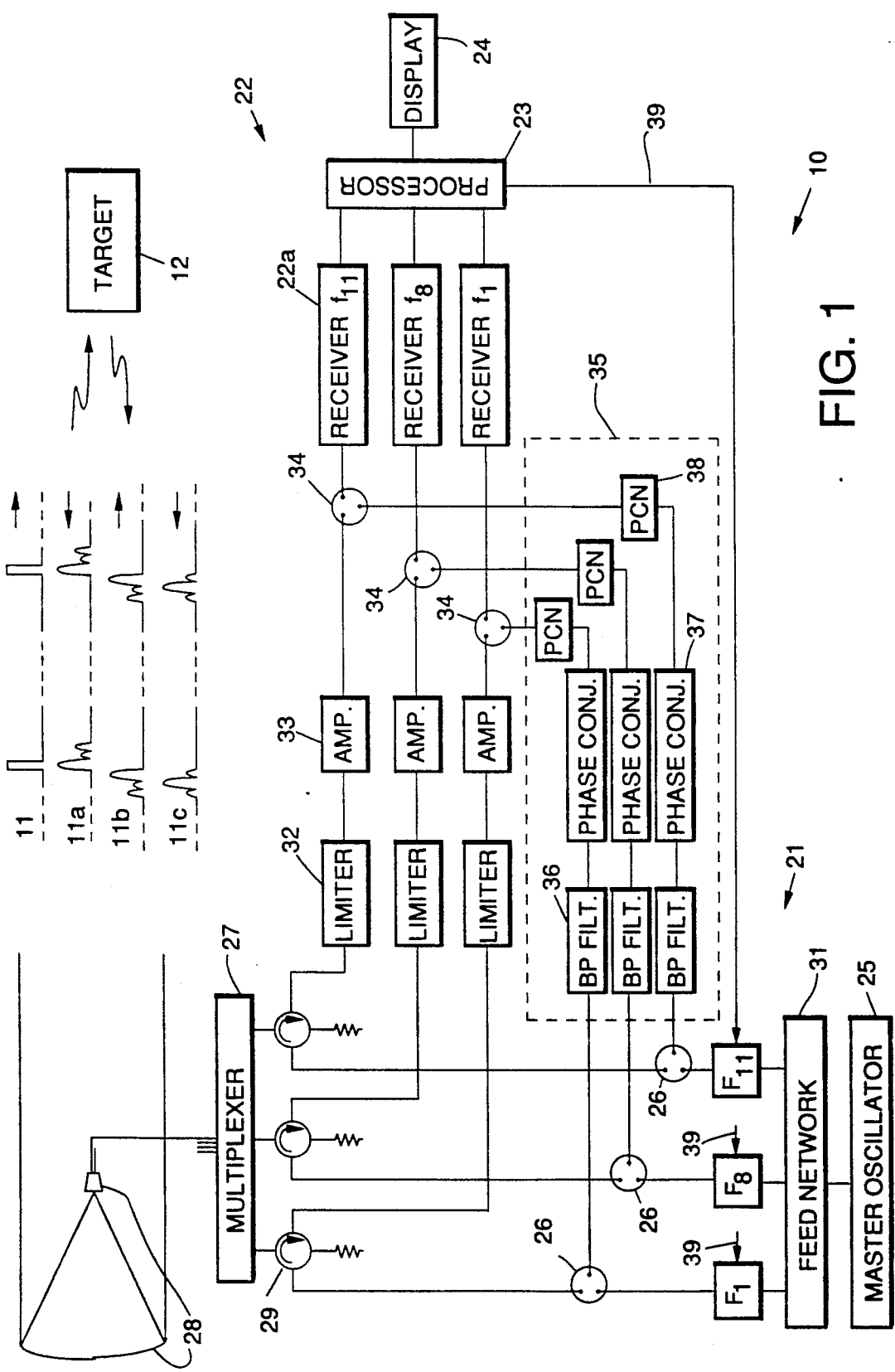
FIG. 1 shows an impulse radar system operated in accordance with the principles of the present invention.

Referring to the drawing figures, FIG. 1 shows an impulse radar system 10 operated in accordance with the principles of the present invention. Two embodiments of the present invention are shown in FIG. 1, and the first shall not be described. The impulse radar system 10 comprises a transmitter 21 (having a plurality of individual phase locked frequency sources $F_1$-$F_{11}$), a receiver 22 that is matched to the transmitter 21, and a processor 23. The receiver 22 has a plurality of individual frequency receivers 22a ($F_1$-$F_{11}$), a plurality of limiters 32, amplifiers 33, and switches 34. It is to be understood that the number of frequency sources is not limited to eleven ($F_1$-$F_{11}$) as is illustrated herein. Eleven sources are disclosed only for the purposes of example. Any number of sources may be employed depending upon the application. This issue shall be addressed in more detail below with respect to a second embodiment of the present invention. Furthermore, these receiver components are conventional in the art and are generally well understood by those skilled in the art.

The transmitter 21 is adapted to provide a plurality of distinct impulse signals having individual phases. The processor 23 is adapted to process a target return signal to produce a phase conjugate signal and cause the transmitter 21 to transmit the phase conjugate signal. The processor is coupled to a display 24 that provides an output signal to an operator. A master oscillator 25 is coupled to the transmitters 21 by way of a feed network 31. The transmitters 21 and receivers 22 are coupled by way of a plurality of duplexers 29 (such as circulators) and a multiplexer 27 to an antenna 28. A more detailed understanding of the impulse radar system 10 may be had from reading U.S. patent application Ser. No. 07/722,768, filed Jun. 27, 1991, for "Ultra Wideband Radar Employing Synthesized Short Pulses", which is assigned to the assignee of the present invention.

Phase conjugator circuitry 35 (shown having a dashed box around it) is comprised of individual band pass filters 36, phase conjugator circuits 37, and pulse compression circuits 38 for each separate frequency. The phase conjugator circuitry 35 is coupled into the transmitter 21 and receiver 22 by means of the switches 26, 34, respectively. The stitches 26,34 are appropriately switched to permit transmitted, received and phase conjugate signals to be sent and received by the system 10. In general, the operation of the system 10 is described below.

FIG. 1 shows that the impulse radar system 10 provides a pulsed signal 11 (pilot pulse 11) that illuminates the target 12. A return signal 11a is reflected from the target 12 that is a result of the interaction of the pulsed signal with the target 12, and in particular with its scattering centers. For a typical target 12, such as an aircraft, for example, these scattering centers include the nose, tail and wings of the aircraft, for example. The return signal 11a thus includes "information" regarding the scattering centers of the target 12.

The return signal 11a is received by the impulse radar system 10 and a phase conjugate pulsed signal 11b is generated in response thereto. In particular, the phase conjugate pulsed signal 11b is the phase conjugate signal of the return signal 11a. The phase conjugate pulsed signal 11b is then transmitted at the target 12. The phase conjugated transmit pulse 11b is a time reversed image signal of the return signal 11a. The phase conjugate pulsed signal 11b interacts with the target 12 and produces a second return signal 11c that is processed by the impulse radar system 10. This second return signal 11c has increased signal to noise ratio, and hence provides for a greater radar cross section of the target 12. Presented below with reference to FIGS. 3-11 are data illustrating the transmitted and received signals as they interact with a test target.

Figure 1A:
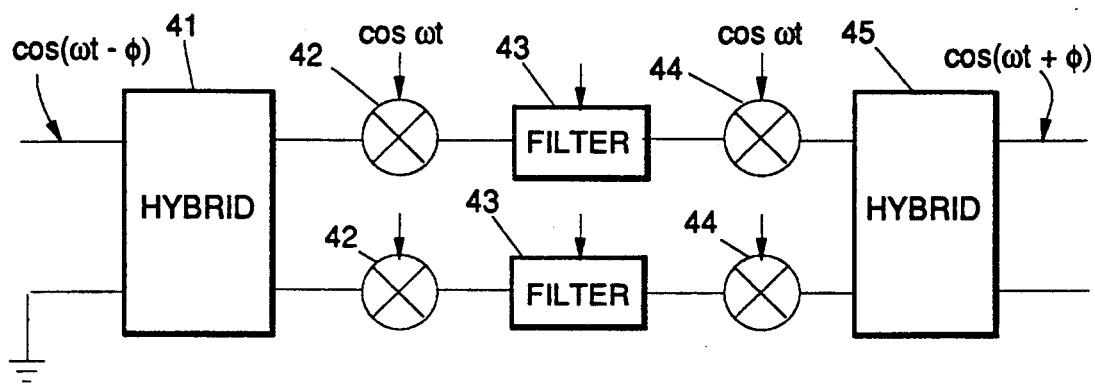
FIG. 1a shows the details of phase conjugator circuitry employed in the system of FIG. 1.

FIG. 1a shows the details of the phase conjugator circuitry 37 employed in the system of FIG. 1. The phase conjugator circuitry 37 is generally well-known in the art and is shown for the purpose of completeness of the present disclosure. The phase conjugator circuitry 37 comprises an input that receives an input signal $\cos(\omega t - \phi)$, for example. A 90° quadrature hybrid 41 receives the input signal and provides output signals that are applied to two multipliers 42. The multipliers 42 multiply the respective output signals by a $\cos(\omega t)$ term. Output signals from the multipliers 42 are coupled through low pass filters 43 and are applied to second multipliers 44 which multiply the respective output signals by a $\cos(\omega t)$ term. A second 90° hybrid 45 provides a phase conjugated output signal $\cos(\omega t + \phi)$ from the phase conjugator circuitry 37. This $\cos(\omega t + \phi)$ signal is the phase conjugate of the input signal $\cos(\omega t - \phi)$.

Figure 2:
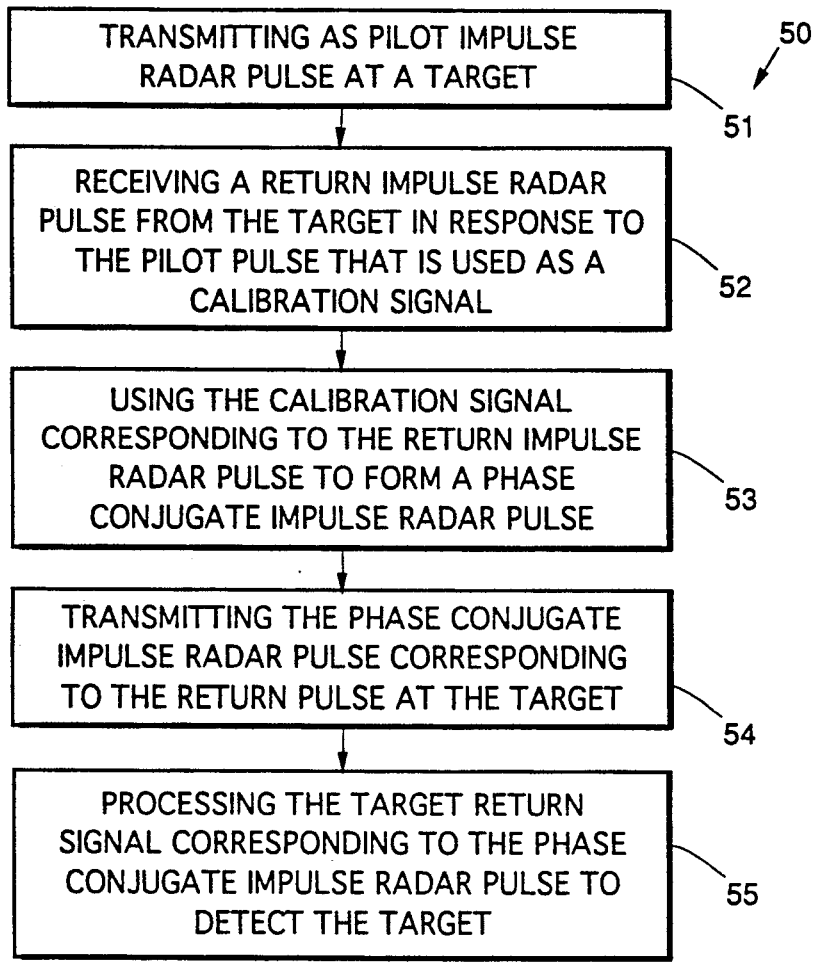
FIG. 2 shows the details of phase conjugator circuitry employed in the system of FIG. 1.

Referring to FIG. 2, an impulse radar operating method 50 in accordance with the principles of the present invention shall be described. FIG. 2 illustrates a flow diagram representative of the method 50 in accordance with the principles of the present invention. The method comprises the following steps. The pilot pulse 11a is transmitted at the target 12, as is illustrated in box 51. The pilot pulse 11a comprises a plurality of individual pulses having respective distinct frequencies generated by the impulse radar system 10. The return pulse 11a from the target 12 is then received by the impulse radar system 10, as is illustrated in box 52. The return pulse 11a provides information indicative of scattering centers on the target 12. The return pulse 11a is used as a calibration signal for generating another transmitted pulse. The calibration signal corresponding to the return pulse is used to form the next phase conjugate transmit pulse 11b, as is illustrated in box 53. The phase conjugate pulse 11b corresponding the the return pulse 11a is then transmitted at the target 12, as is illustrated in box 54. The target return signal 11c derived from the transmitted phase conjugate pulse 11b enhances the radar cross section of the target 12. This target return signal 11c is then processed in a conventional manner to detect the target 12, as is illustrated in box 55. This is achieved since the waveform of the transmitted phase conjugate pulse is matched to the characteristics of the target 12.

Figure 3:
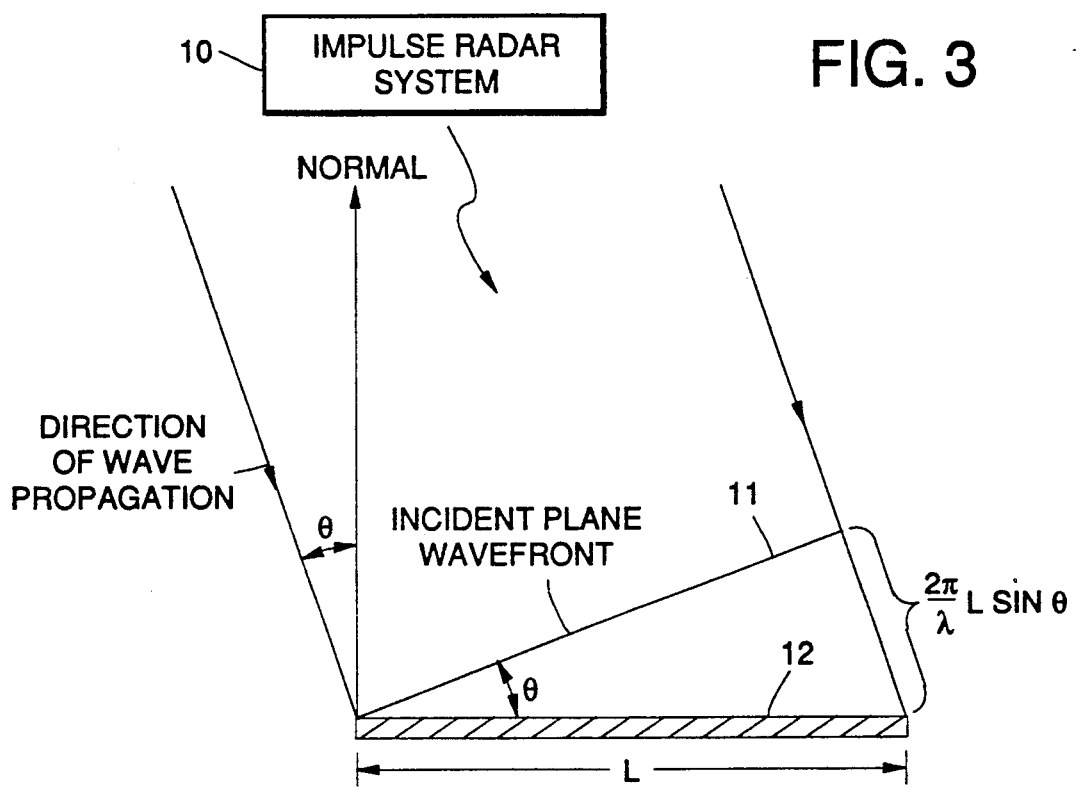
FIG. 3 is an illustration defining the fill-up time of a plane wavefront illuminating a flat plate.

In order to better understand the present invention reference is made to FIG. 3 which illustrates the pulsed signal 11 from the impulse radar system 10 that illuminates the target 12, represented by a flat metal plate 12 in FIG. 3. When the incident pulsed signal 11 (plane wavefront) strikes the plate 12, the signal 11 is reflected away from the plate 12 at a specular angle in accordance with Snell's law, which states that the angle of reflection is equal to the angle of incidence. Hence, there is no retrodirective reflection in the direction of the incident signal (or radar source) except at the broadside direction of the plate 12 (normal to the plate 12). The present invention provides an incident signal waveform that causes the reflected signal from the plate 12 to be not only in the specular direction but also in the retrodirective direction.

When the incident plane wavefront of the pulsed signal 11 strikes the plate 12, the portion of the flat plate 12 that is illuminated at any given instant of time depends upon the length of the pulsed incident signal 11. In order for the plate 12 to be completely illuminated, the length of the incidence pulsed signal 11 has to be at least equal to or greater than the "fill-up" time of the plate 12 as is shown in FIG. 1. The "fill-up" time is defined by the relationship; fill-up time=$L\sin\theta/c$, where L is the length of the metal plate $\theta$ is the incidence angle from broadside (plate normal), and c is the velocity of light in free space.

Figure 4:
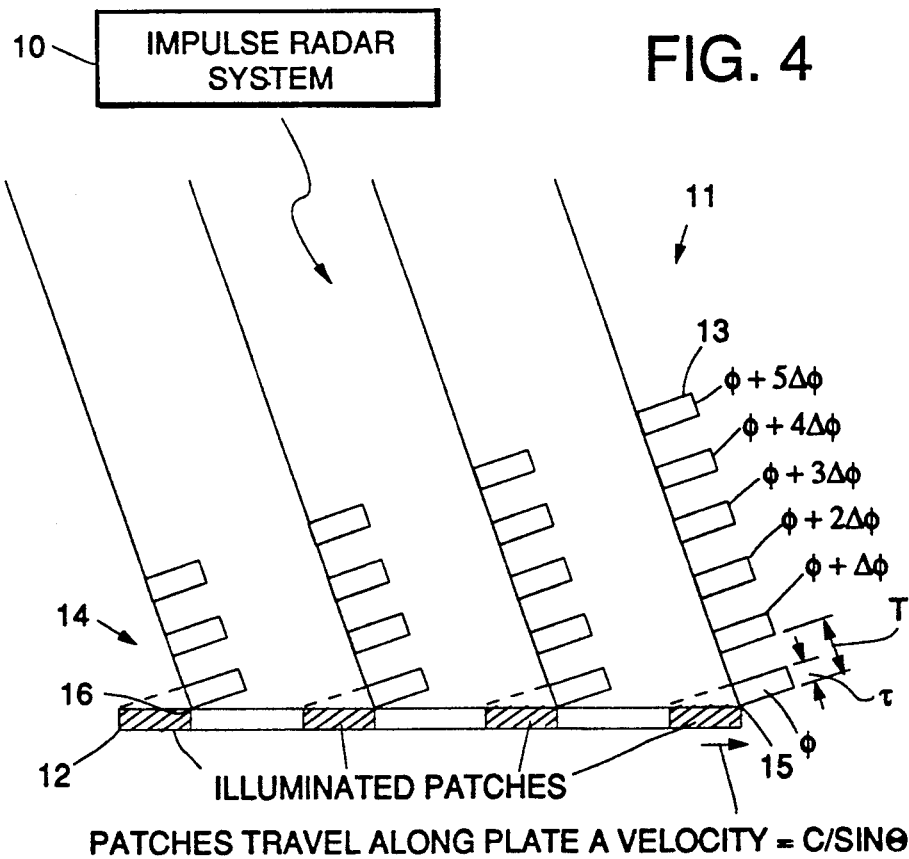
FIG. 4 shows a phase coded impulse waveform.

However, when the pulse length is less than the fill-up time, only a portion of the plate 12 is illuminated. Therefore, when the incident signal 11 is a train of extremely short pulses 13 (or impulses 13), only patches of the plate 12 are illuminated, as is illustrated in FIG. 4. The blank gaps between the illuminated patches correspond to the dead time between the pulses. As the incident wavefront of short pulses 13 strikes the plate 12, the illuminated patches travel across the plate 12 as a travelling wave. The phase velocity of this travelling wave (the component of the wave along the direction of the plate 12) is given by: $V_p = c\sin\theta$. For a given pulse duration "$\tau$", the length of the illuminated patch "$\xi$" is given by: $\zeta = \tau c/\sin\theta$ = pulse length/$\sin\theta$. For example, the length of the illuminated patch is approximately 4.09 inches when a 100 picosecond pulse 13 strikes the plate 12 at an incidence angle of 30 degrees.

At any given instant of time, however, an array of illuminated patches 14 exists across the plate 12. This array of illuminated patches 14 appear as a travelling wave across the plate 12 as long as the train of incident pulses 13 strikes the plate 12. For a finite size plate 12, a portion of this incident travelling wave reflects from the trailing edge 15 (edge away from the incident source) of the plate 12. This reflected travelling wave (backward towards the incident source) contributes to the radar cross section in the retrodirective direction. A portion of this reflected traveling wave is again reflected from the front edge 16 (edge toward the incident source). Under certain conditions, there is significant interaction between the incident waves and the reflected waves. For example, when the incident field is polarized with E-field perpendicular to the plane of incidence at a grazing angle, the radar cross section is an oscillatory function of the length of the plate and frequencies. In general, multiple bounces occur in the plate 12 illuminated by an incident plane wave comprising a pulse train. When the pulse repetition time, T, is properly adjusted, the radar cross section contributed by the backward travelling wave adds in phase in the retrodirective direction.

Figure 5:
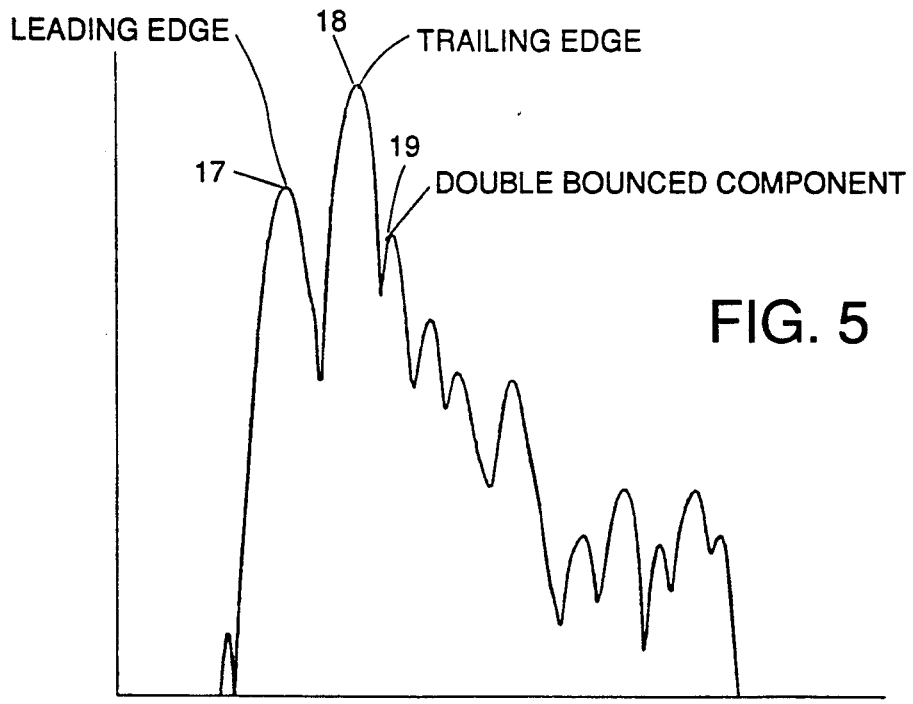
FIG. 5 shows the measured scattered amplitude due to a short pulse impinging at $\theta = 40°$ on a target.
Figure 6:
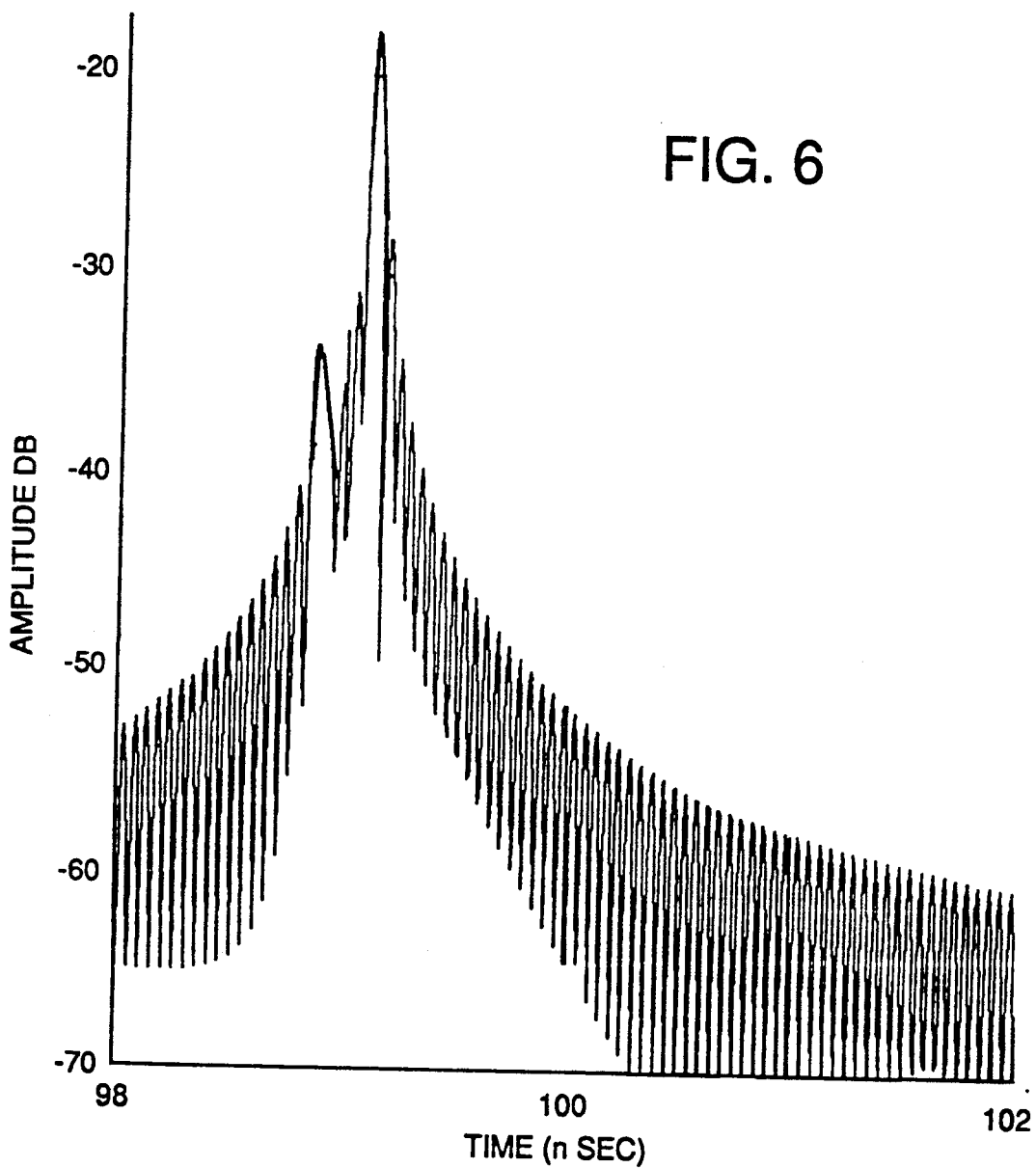
FIG. 6 shows the computed scattering pattern for the short pulse of FIG. 4.
Figure 7:
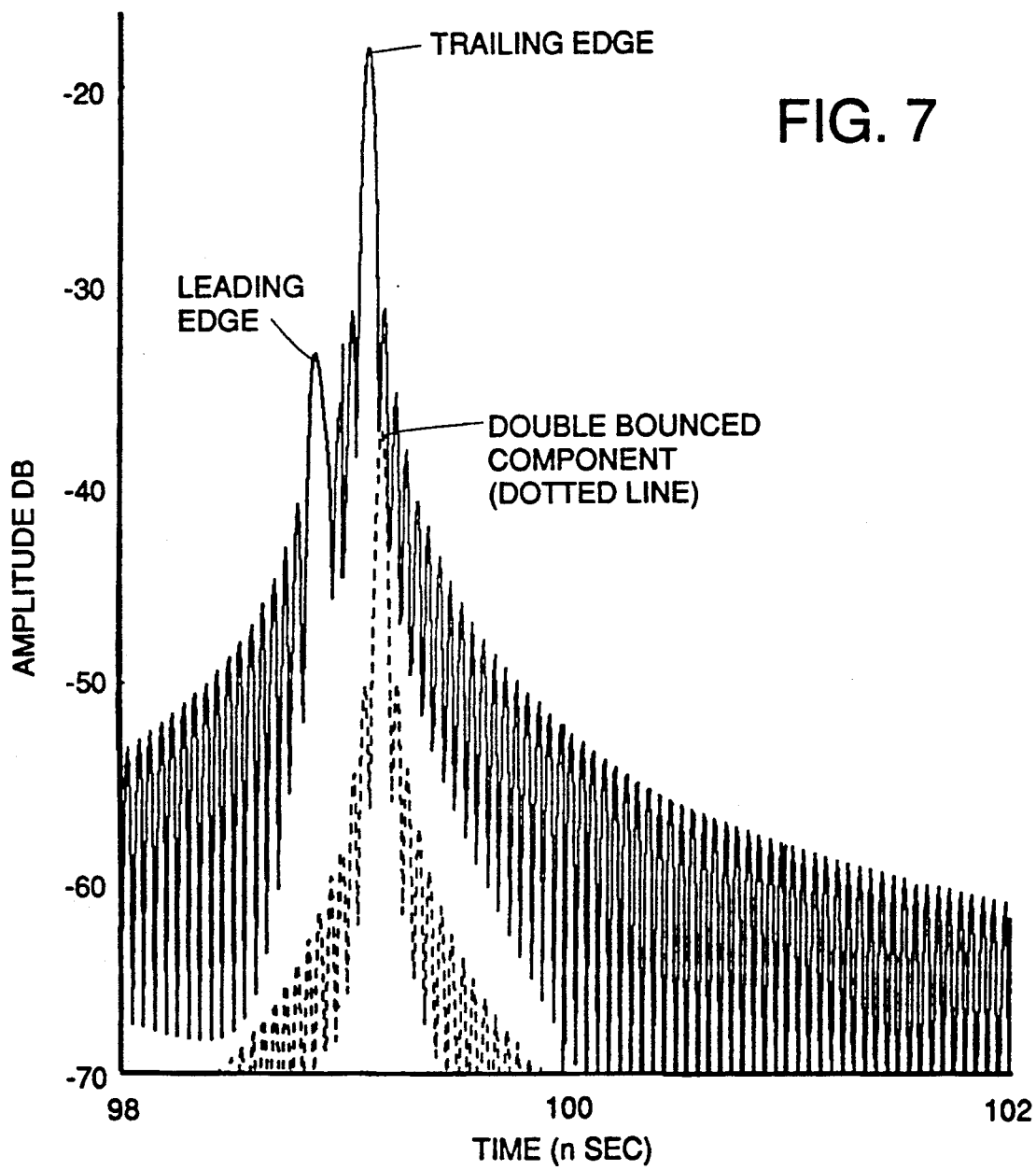
FIG. 7 show the computed scattering patterns due to the leading edge, the trailing edge and the double-bounced component for the short pulse of FIG. 4.
Figure 8:
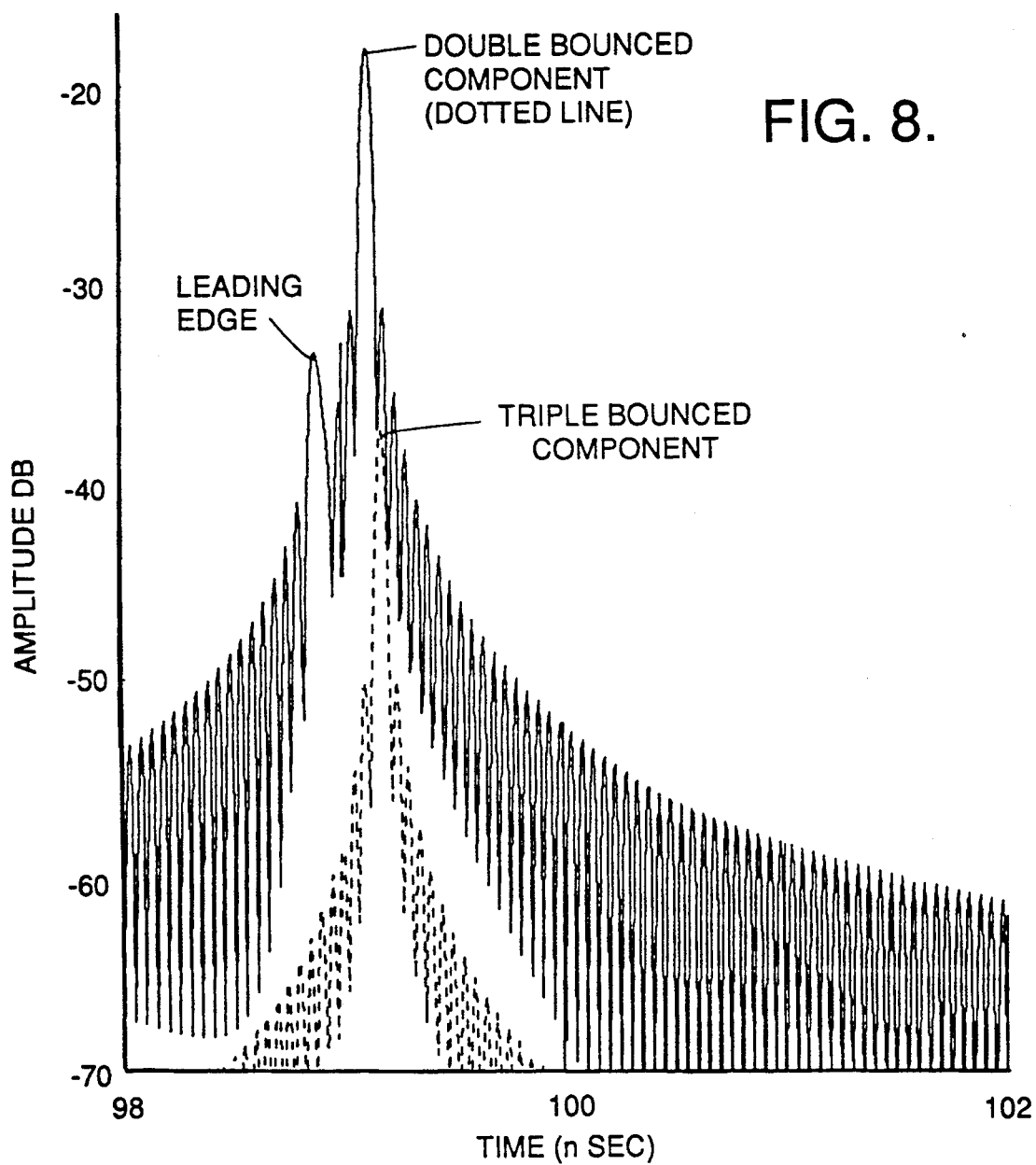
FIG. 8 show the compound scattering patterns due to the double-bounced and the triple-bounced components for the short pulse of FIG. 4.

The multiple bounce time is related to the path separation length corresponding to the incident angle and the path length difference between the scattering edges 15, 16. FIG. 5 shows a measured reflected signal due to a short pulse impinging on a target 12, comprising a flat plate 12 of size 12 inches×21 inches, at an angle $\theta = 40°$. The leading edge 16 produces the first peak return 17, the trailing edge 15 produces the second peak return 18, and the multiple bounces add to the third peak return 19 and other peaks. An analysis of this case has been carried out using a computer simulation. FIG. 6 shows the computed scattering pattern derived from this simulation. It is seen that the computed pattern is in close agreement with the measured data. FIG. 7 shows the scattering pattern due to the front and the trailing edges 15, 16. Also shown in FIG. 7 is the scattering pattern due to double bounced component (lower curve). FIG. 8 shows the double-bounced component compared with the triple bounced compartment. For the reinforcement of the retrodirective radar cross section to take place, the pulse repetition time between pulses 13 is made equal to the time delay between the scatter returns from the edges 15, 16 as given by the relationship $T = 2L\sin\theta/c$. Similarly, the radar cross section due to the double-bounced component can add to the leading edge component if T is given by the relationship: $T = L\sin\theta/c + L/c$.

Figure 11:
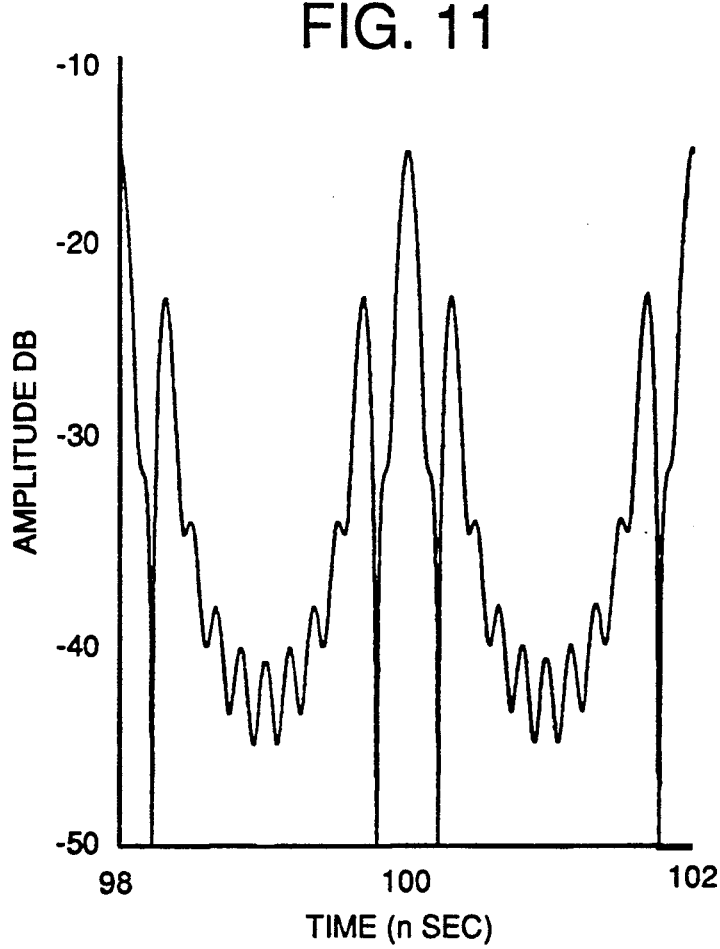
FIG. 11 shows the response using a phase conjugate waveform incident on a target at $\theta = 5°$.
Figure 9:
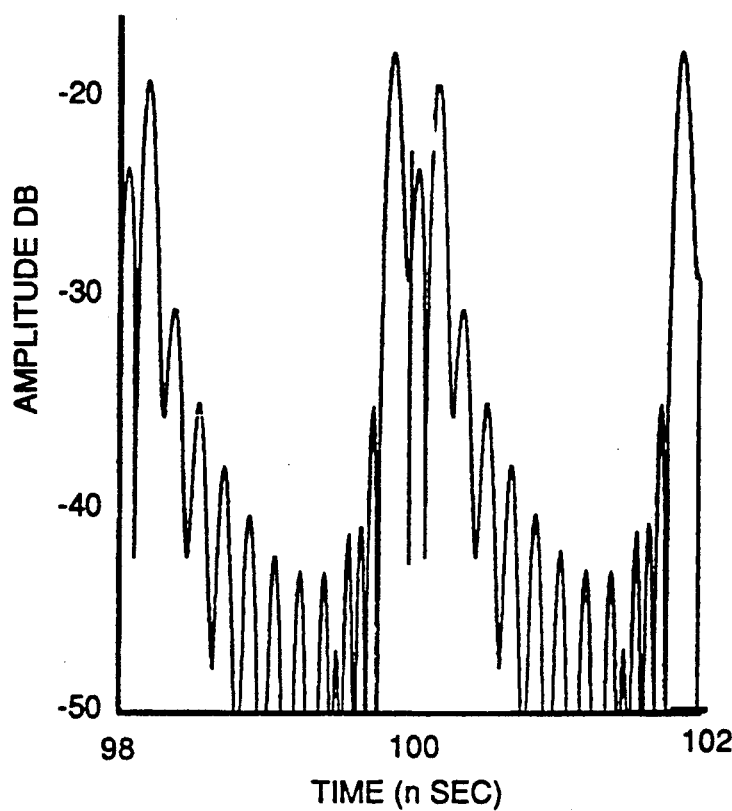
FIG. 9 shows the response due to an impulse train incident on a target at $\theta = 5°$.
Figure 10:
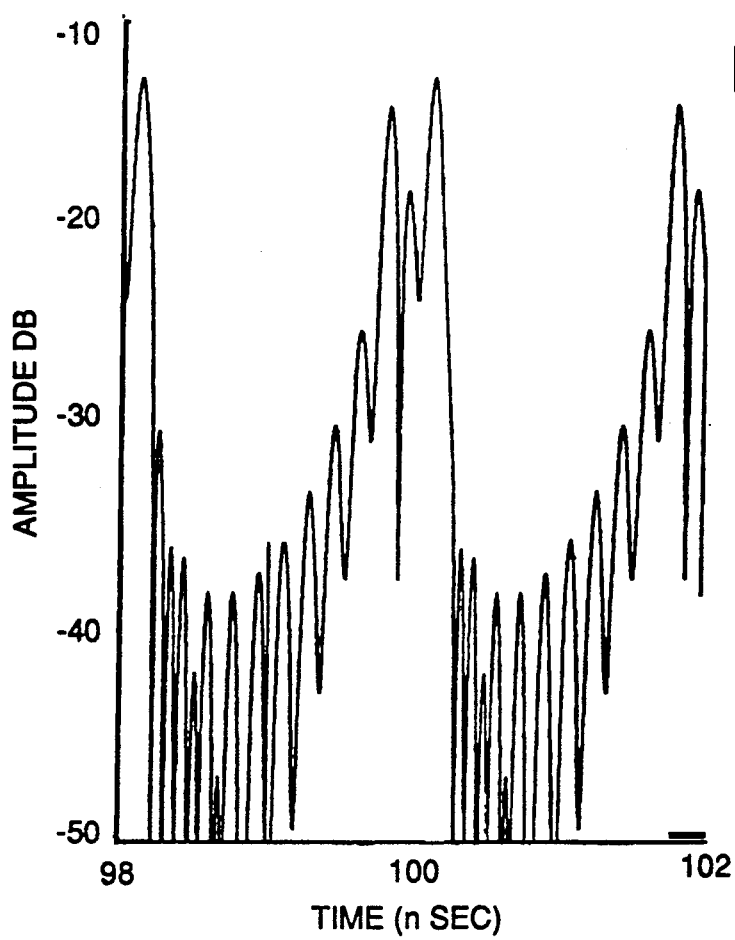
FIG. 10 shows the incident pulse train using a phase conjugate waveform incident on a target at $\theta = 5°$.

Other similar formulas can be deduced for higher order bounces. The formation of this retrodirective signals enhances the radar return, and by generating such signals, they may be used to detect low radar cross section targets. For targets with multiple edges and scattering centers, increased radar cross section enhancement is obtained. For example, FIG. 9 shows the response due to an impulse train incident on the target 12(21 inch×12 inch plate) at $\theta = 5°$. The impulse train has eleven frequency components with f=0.5 GHz to 5.5 GHz, separated by $\Delta f = 0.5$ GHz. The peak response due to the leading edge and the tailing edge are separated by roughly $2L\sin\theta/C$. To achieve the reinforcement of the response due to the leading edge 15 and the trailing edge 16, it is desirable to produce a transmit waveform with pulses separated by $2L\sin\theta/C$. One way of achieving this is to transmit an incident pulse train using phase conjugated wave form of the impulse response given in FIG. 9. This phase conjugation waveform is shown in FIG. 10. The response due to the phase conjugated waveform incident on the target 12 (21 inch 12 inch plate) at $\theta = 5°$ is shown in FIG. 11. A larger peak response is obtained by this method.

The above description of the radar cross section enhancement phenomenon is discussed from a time domain point of view. However, the same phenomenon may also be understood and explained from a frequency domain point of view and may be readily implemented in the frequency domain. The details of the frequency domain approach will not be described in detail.

An experiment was conducted to simulate the radar cross section of the flat plate 12 illuminated by a pulse train comprising five spectral components. The frequencies of the five spectral components started at 1.7 GHz and end at 2.9 GHz in increments of 300 MHz. A square flat plate 12 of size 8 inch×8 inch was used in the experiment. An incident plane wave with E-field polarized in the plane of incidence (TM case) was used to illuminate the plate 12. The amplitudes and phases of monostatic radar cross sections of the plate 12 for the various frequency components were measured as a function of incident angles. The phases for these frequencies were normalized to the broadside incident angle. The radar cross section for an oblique incident angle ($\theta = -52°$) was about $-12$ dBsm for each individual frequency. By adjusting the phases of each spectral component such that the radar cross section for these frequencies have equal phase at $\theta = -52°$ and then summing up the five spectral components, the radar cross section was increased to about $+3$ dBsm at $\theta = -52°$. The pulse train of the radar cross section formed by these five frequency components contained pulses that were spaced at 3.3 nsec and the pulsewidth was on the order of 0.833 nsec. The phase between the adjacent pulses varied in a linear progression with an incremental phase difference of 240°. These received signals were processed using a conventional matched filter to provide for radar cross section enhancement.

Referring again to FIG. 1, the second embodiment of the present invention will now be described. In this embodiment, the system 10 of FIG. 1 does not employ the phase conjugator section (shown inside the dashed box), but instead employs frequency control lines 39 coupled from the processor 23 to each of the phase locked frequency sources in the transmitter 21. When a progressive phase variation is applied to the pulse train comprising the transmit pulses 11, the radar cross section contributed by the backward travelling wave can be made to add in phase in the received direction (at the location of the system 10) by processing the received target return pulses 11a while adaptively adjusting the phase sequence of the transmitted pulses 11. When the appropriate phase sequence is achieved which is such that the transmitted pulses match the scattering centers on the target 12, then an enhanced return signal 11b is received. More specifically, the present invention achieves an enhanced target radar cross section by transmitting impulse radar pulses 11 having a predetermined phase sequence. The target return signals 11a are then monitored. The transmitted signals 11 are then adaptively adjusted to change the transmitted phase sequence to obtain an enhanced return signal 11b, when viewed on the display 24, for example.

As was mentioned previously, apparatus for generating a train of these pulses in described in U.S. patent application Ser. No. 07/722,769, filed Jun. 27, 1991, for "Ultra Wideband Radar Employing Synthesized Short Pulses", which application is assigned to the assignee of the present invention. In this patent application, it is taught that a train of impulses may be formed in space by radiating all the Fourier frequency components of the impulses through an antenna that has a common phase center for all the frequencies. As an example, a train of ten impulses (each impulse is 200 picoseconds long) spaced at two nanoseconds apart may be formed by simultaneously rediating eleven spectral components starting from 500 MHz to 5500 MHZ in increments of 500 MHz. The total radiated bandwidth of 5000 MHz corresponds to the 200 picoseconds long pulse.

In order to generate the required phase difference between the impulses, one approach is to vary the starting frequency of the spectral lines. For example, when the starting frequency of the eleven spectral components starts from 565.5 MHz and ends at 5562.5 HMz in increments of 500 MHz, the phase difference between two adjacent impulses is 45 degrees, and it varies in a linear progression. Similarly, by changing the starting frequency to either 625 MHz or 687.5 MHz or 750 MHz, the phase difference between two adjacent impulses changes from 90 degrees to 135 degrees, and to 180 degrees, respectively. Thus, any required phase differences between impulses in generating a retrodirective signal is accomplished by changing the starting frequency of the Fourier spectral lines of the impulse signal waveform.

A second way to adjust the value of T ($=1/\Delta f$) is to appropriately select differing subsets of individual frequencies chosen for transmission. By providing a large number of frequency sources, say $f_1$ to $f_N$, where N is a relatively large number, and selecting differing subsets of these frequencies, $\Delta f$ may be readily changed thus changing the value of T.

Thus there has been described new and improved impulse radar systems and methods for enhancing the radar cross section of targets. It is to be understood that the above-described embodiments are merely illustrative of some of the many specific embodiments which represent applications of the principles of the present invention. Clearly, numerous and other arrangements can be readily devised by those skilled in the art without departing from the scope of the invention.

What is claimed is:

1. A method of enhancing the radar cross section of a target when using an impulse radar system, said method comprising the steps of:
    transmitting a pilot impulse radar pulse at a target, which pilot pulse comprises a plurality of individual pulses having respective distinct frequencies generated by an impulse radar system;
    receiving a return pulse from the target, which return pulse provides information indicative of scattering centers on the target, and wherein the return pulse is used as a calibration signal;
    processing the calibration signal corresponding to the return pulse to form a phase conjugated transmit pulse; and
    transmitting the phase conjugated transmit pulse at the target;
    processing a target return signal derived from the transmitted phase conjugated pulse;
    and wherein the target return signal derived from the transmitted phase conjugated pulse has an enhanced radar cross section of the target since the waveform of the transmitted phase conjugated pulse is matched to the characteristics of the target.

2. A method of enhancing the radar cross section of a target when using an impulse radar system, said method comprising the steps of:
    transmitting a train of impulse radar pulses at a target, which pulses comprise a plurality of distinct frequencies generated respectively by multiple frequency sources of an impulse radar system;
    receiving return pulses from the target, which return pulses comprise information indicative of scattering centers on the target;
    adaptively adjusting the phases of the transmitted pulses in response to the return pulses in such a manner as to cause the radar cross section contributed by the backward traveling wave on the target to be made to add in phase in the received direction;
    processing said return pulses by summing the spectral components comprising return pulses derived from the transmitted pulses having adjusted phases to increase the radar cross section of the target.

3. The method of claim 2 wherein the step of transmitting impulse radar pulses comprises transmitting impulse radar pulses wherein the pulse repetition time between pulses is made equal to the time delay between scatter returns from scattering centers on the target.

4. The method of claim 2 wherein the step of adaptively adjusting the phases of the transmitted pulses comprises changing a starting frequency of Fourier spectral lines of the waveform of the impulse signal to provide for desired phase differences between impulses to generate the transmitted phase conjugate impulse radar pulse.

5. The method of claim 1 wherein the step of transmitting the phase conjugated pulse comprises transmitting a phase conjugate impulse radar pulse generated by selecting and transmitting differing predetermined subsets of frequencies from a relatively large number of predetermined frequencies.

6. An impulse radar system comprising:
    a transmitter for transmitting a pilot impulse radar pulse at a target, which pilot pulse comprises a plurality of individual pulses having respective distinct frequencies;
    a receiver for receiving a return impulse radar pulse from the target, which return pulse provides information indicative of scattering centers on the target, which return pulse provides a calibration signal; and
    processing means coupled to the transmitter and receiver for processing the calibration signal corresponding to the return impulse radar pulse to form a phase conjugate impulse radar pulse;
    wherein the transmitter is adapted to transmit the phase conjugate pulse at the target, and wherein the receiver is adapted to process a target return signal derived from the transmitted phase conjugate pulse, and wherein the target return signal derived from the transmitted phase conjugated pulse enhances the radar cross section of the target since the waveform of the transmitted phase conjugated pulse is matched to the characteristics of the target.

7. An impulse radar system comprising:
    a transmitter for transmitting impulse radar pulses at a target, wherein said transmitter comprises a plurality of individual frequency sources for generating a train of pulses, which pulses comprise a plurality of distinct frequencies;

a receiver for receiving return pulses from the target, which return pulses provide information indicative of scattering centers on the target; and processing means coupled to the transmitter and receiver for processing the return pulses and for adaptively adjusting the phase of the transmitted pulses that are transmitted at the target in response to the return pulses in such a manner as to cause the radar cross section contributed by the backward traveling wave on the target to be made to add in phase in the received direction; and wherein the transmitter transmits the pulses having adaptively adjusted phases at the target, and wherein the receiver sums the spectral components comprising return pulses derived from the transmitted pulses having adjusted phases to increase the radar cross section of the target.

8. The system of claim 7 wherein the transmitter includes means for varying the repetition rate of the impulse radar pulses, wherein the pulse repetition time between pulses is made equal to the time delay between scatter returns from scattering centers on the target.

9. The system of claim 7 wherein the transmitter further comprises means for changing a starting frequency of Fourier spectral lines of the waveform of the impulse signal to provide for desired phase differences between respective impulses to generate the transmitted phase conjugated pulse.

10. The system of claim 7 wherein the transmitter includes means for selecting and transmitting differing predetermined subsets of frequencies from a predetermined number of available frequencies, wherein the pulse repetition time between pulses is made equal to the time delay between scatter returns from scattering centers on the target.

11. The system of claim 7 wherein the transmitter comprises means for adjusting the phases of each spectral component such that the radar cross section for selected frequencies have equal phase at a desired angle of incidence.

* * * * *